United States Patent
Chang

(10) Patent No.: US 7,190,648 B2
(45) Date of Patent: Mar. 13, 2007

(54) METHOD OF DYNAMICALLY PARTITIONING A MEMORY OF A RECORDING MEDIUM

(75) Inventor: Sung-San Chang, Taipei (TW)

(73) Assignee: Lite-On IT Corporation, Taipei (TW)

( * ) Notice: Subject to any disclaimer, the term of this patent is extended or adjusted under 35 U.S.C. 154(b) by 672 days.

(21) Appl. No.: 10/643,176

(22) Filed: Aug. 18, 2003

(65) Prior Publication Data

US 2004/0042361 A1 Mar. 4, 2004

(30) Foreign Application Priority Data

Aug. 27, 2002 (TW) .............................. 91119419 A

(51) Int. Cl.
*G11B 7/00* (2006.01)

(52) U.S. Cl. .............................. 369/47.52; 369/53.37; 369/59.25

(58) Field of Classification Search ............. 369/47.52, 369/44.36, 53.2, 53.28, 53.24, 59.25, 124.08, 369/275.3, 275.4, 47.21, 47.22, 53.26, 53.37; 711/147, 173

See application file for complete search history.

(56) References Cited

U.S. PATENT DOCUMENTS

| | | | |
|---|---|---|---|
| 5,606,536 A * | 2/1997 | Watanabe et al. | 369/44.36 |
| 6,580,684 B2 * | 6/2003 | Miyake et al. | 369/275.3 |
| 6,671,249 B2 * | 12/2003 | Horie | 369/275.3 |
| 6,785,213 B2 * | 8/2004 | Shishido et al. | 369/59.25 |
| 6,898,172 B2 * | 5/2005 | Fairman et al. | 369/275.3 |

* cited by examiner

*Primary Examiner*—Thang V. Tran
*Assistant Examiner*—Kim-Kwok Chu
(74) *Attorney, Agent, or Firm*—Thomas, Kayden, Horstemeyer & Risley

(57) ABSTRACT

A method for dynamically partitioning a memory of a recording medium is disclosed. The memory has a first and second block to store the optimal recording power records for CD-R and the recording power records for CD-RW respectively. The method includes predetermining a ratio of memory spaces of the first and second block and selecting a first or second partitioning method to determine the ratio of memory spaces of the first and second blocks when the ratio is not predetermined.

12 Claims, 4 Drawing Sheets

METHOD OF DYNAMICALLY PARTITIONING A MEMORY OF A RECORDING MEDIUM

BACKGROUND OF THE INVENTION

1. Field of the Invention

The present invention relates to a method for dynamically partitioning a memory of a recording medium and particularly to a method for dynamically adjusting a space ratio of partitions in the memory.

2. Description of the Prior Art

A recording medium determine an optimal recording power for a recording disk to be recorded according to its recording speed, disk process and disk manufacturer, and stores the optimal recording power into a memory such as an EEPROM before writing data. Because there are mainly two types of recordable disks, CD-R (Recordable CD) and CD-RW (Re-Writable CD), the memory in the recording medium is evenly partitioned into two blocks respectively for CD-R and CD-RW. Moreover, the optimal recording power records for each type of recordable CD are stored into corresponding blocks of the memory sequentially from a low to a high memory address. For each block, the optimal recording power record in the lowest memory address will be erased to add a new record into the block when the block is full.

However, most users prefer using only CD-R or CD-RW, and rarely use both. Thus, there is always one block more frequently used than the other. This not only leads to a low memory efficiency but also reduces the lifetime of the memory due to frequent erasing operations.

SUMMARY OF THE INVENTION

The object of the present invention is to provide a method for dynamically adjusting a space ratio of partitions in the memory of the recording medium. By a graphical user interface, users are allowed to determine the space ratio of the partitions for the CD-R and CD-RW or to enable automatic partition in which the space ratio is determined according to the numbers of the optimal recording power records for CD-R and CD-RW. This improves memory efficiency and the lifetime of the memory.

The present invention provides a method for dynamically partitioning a memory of a recording medium. The memory has a first and second block to store the optimal recording power records for CD-R and CD-RW respectively. The method comprises steps of predetermining a ratio of memory spaces of the first and second block, and selecting a first or second partitioning method to determine the ratio of memory spaces of the first and second blocks when the ratio is not predetermined.

The first partitioning method comprising step of determining the ratio of memory spaces of the first and second blocks according to a first predetermined value when a difference between the number of the optimal recording power records for CD-R and CD-RW reaches the first predetermined value; while the second partitioning method comprising step of determining the ratio of memory spaces of the first and second blocks according to a ratio of the optimal recording power records for CD-R to the optimal recording power records for CD-RW when a total of the optimal recording power records reaches a second predetermined value.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
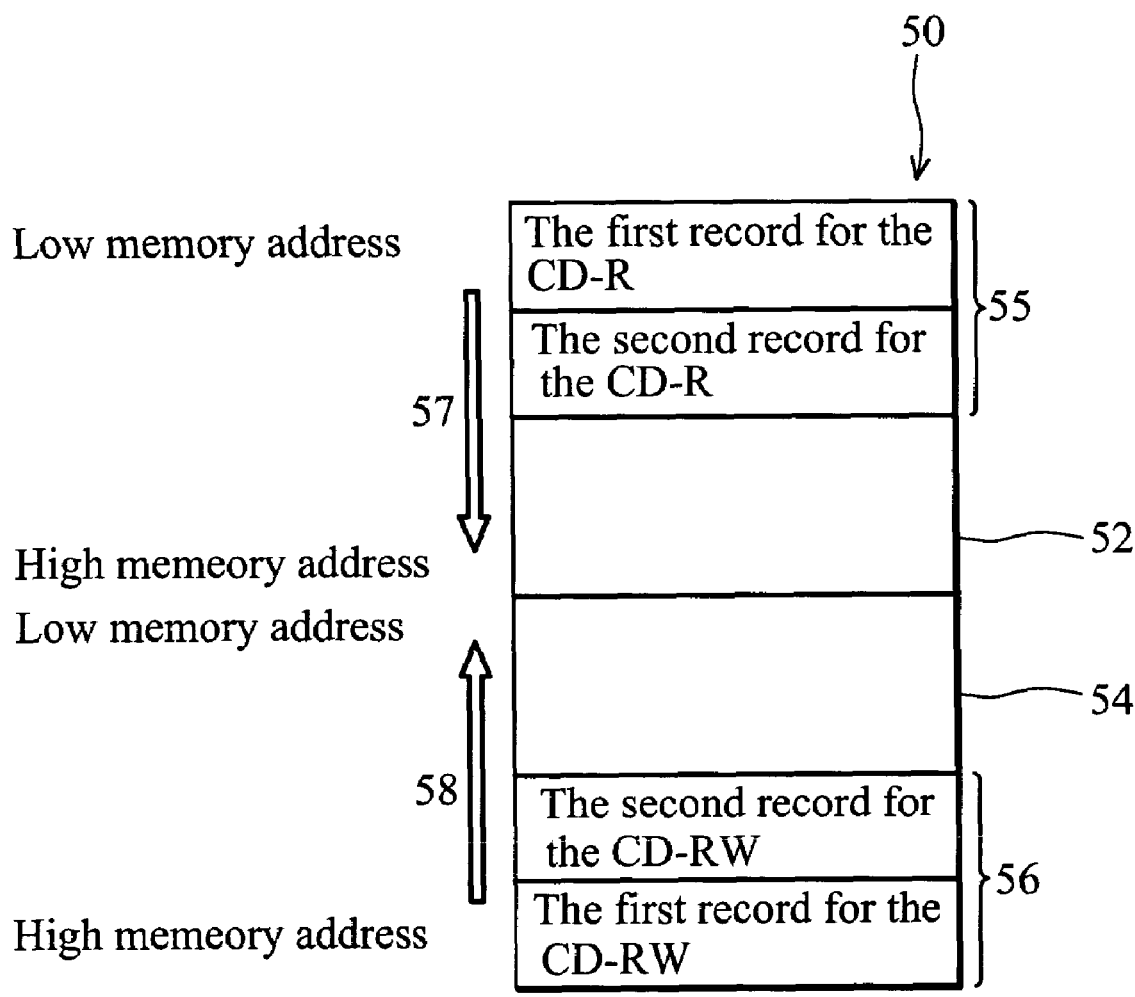
FIG. 1 is a diagram showing a memory which store the optimal recording power records in a recording medium according to one embodiment of the invention.

FIG. 1 is a diagram showing the memory to store records of optimal recording power in a recording medium according to one embodiment of the invention. The memory 50 includes a first block 52 and a second block 54 which store records of optimal recording power for CD-R 55 and CD-RW 56 respectively. The ratio of memory spaces of the first and second blocks (52 and 54) is predetermined by the user, or is automatically and dynamically determined by the numbers of the optimal recording power records in the first and second block. The space ratio may be also determined by the user's input through a graphical user interface, similar to the operation of system disk partition(i.e. FDISK). The optimal recording power records for CD-R 55 are stored in the first block 52 sequentially from the lowest to the highest memory address while the optimal recording power records for CD-RW 56 are stored in the second block 54 sequentially from the highest to the lowest memory address, as shown by the arrows (57 and 58) in FIG. 1. It is noted that the lowest memory address of the second block 54 is higher than the highest memory address of the first block 52. Alternatively, the lowest memory address of the first block 52 may be higher than the highest memory address of the second block 54. If the user prefers to use only one single type of recordable CD, the space ratio of the first and second blocks is dynamically adjusted for the user's preference. Also there is little programming or erasing operation applied to the memory cells wherein the block storing the records of optimal recording power for the infrequent used CD type before the space ratio is adjusted. Consequently, after a new ratio is determined, the lifetime of these memory cells are still long enough to store the optimal recording power records.

Moreover, The locations of the first and second blocks are interchangeable, i.e., the optimal recording power records for CD-R 55 may be stored in the first block 52 sequentially from the highest to the lowest memory address while the optimal recording power records for CD-RW 56 may be stored in the second block 54 sequentially from the lowest to the highest memory address.

Figure 2A:
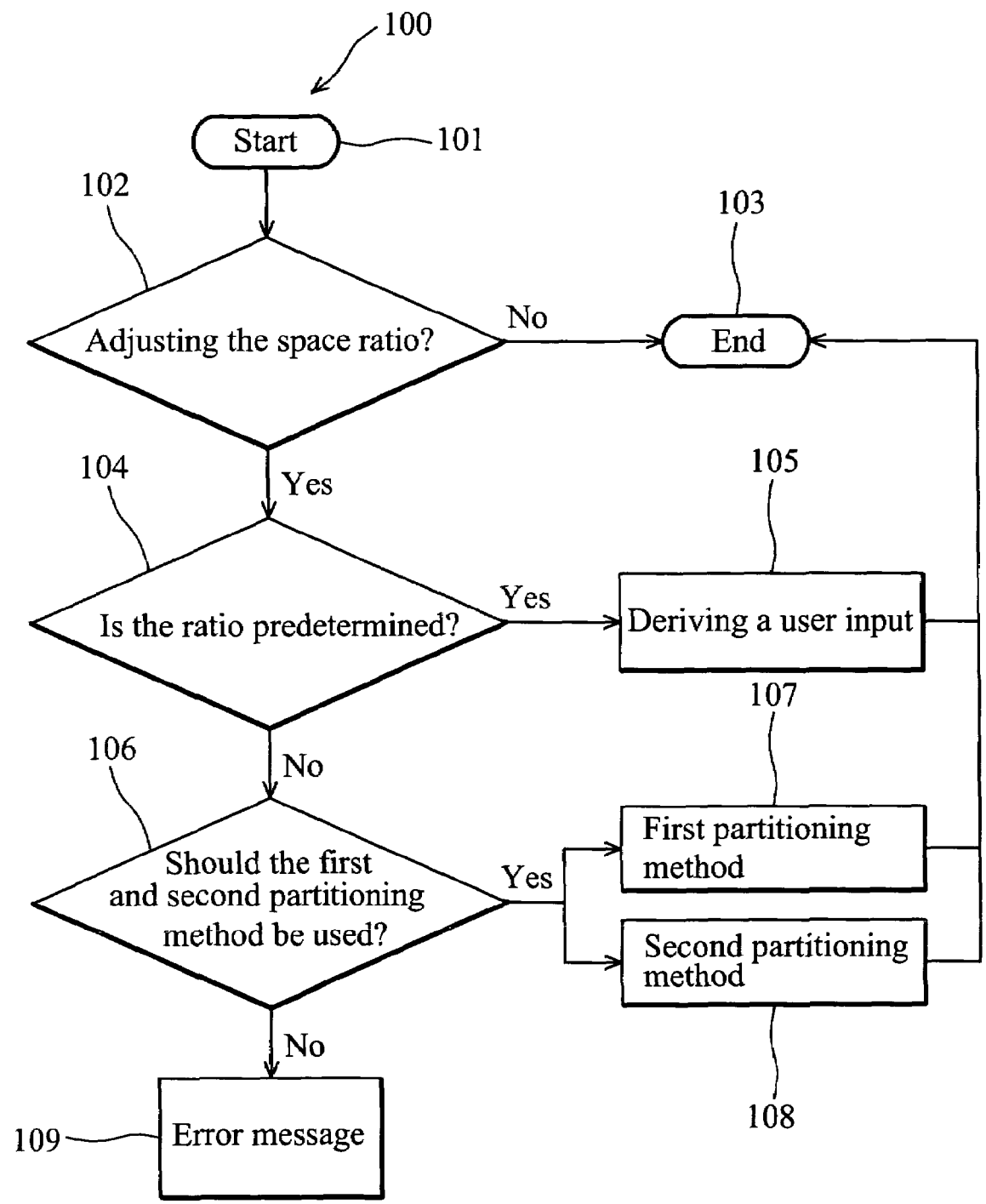
FIG. 2A is a flowchart of a method for dynamically partitioning a memory to store records of optimal recording power of a recording medium according to one embodiment of the invention.

FIG. 2A is a flowchart of a method for dynamically partitioning a memory of a recording medium according to one embodiment of the invention.

In step 102, it is determined whether the user wants to adjust the space ratio of the blocks. If the user does, step 104 is implemented; otherwise, the procedure is ended.

In step 104, it is determined whether the ratio is predetermined. If so, step 105 is implemented; otherwise, step 106 is implemented.

In step 105, the space ratio or space of the two blocks are derived from the user or determined by the firmware in the recording medium.

In step 106, it is determined whether the space ratio should be adjusted by a first or second partitioning method. If by the first partitioning method, step 107 is implemented. If by the second partitioning method, step 108 is implemented. Otherwise, step 109 is implemented.

In step 107, the first partitioning method is implemented.

In step 108, the second partitioning method is implemented.

In step 109, an error message is generated.

The recording medium includes a memory wherein the records of optimal recording power are stored. The memory has a first and second block which store the optimal recording power records for CD-R and CD-RW respectively. In the present invention, the ratio of the two blocks can be derived from the user's input, as described in step 105, or determined by the recording medium according to the numbers of the optimal recording power records in the first and second block, as described in step 107 and 108.

Although the entire procedure is ended after steps 105, 107 and 108 are implemented, the user is allowed to readjust the ratio during the operation of the recording medium. That is to say, the user may set the ratio by input through user graphic interface, or adopt the first or second partitioning method anytime.

Figure 2B:
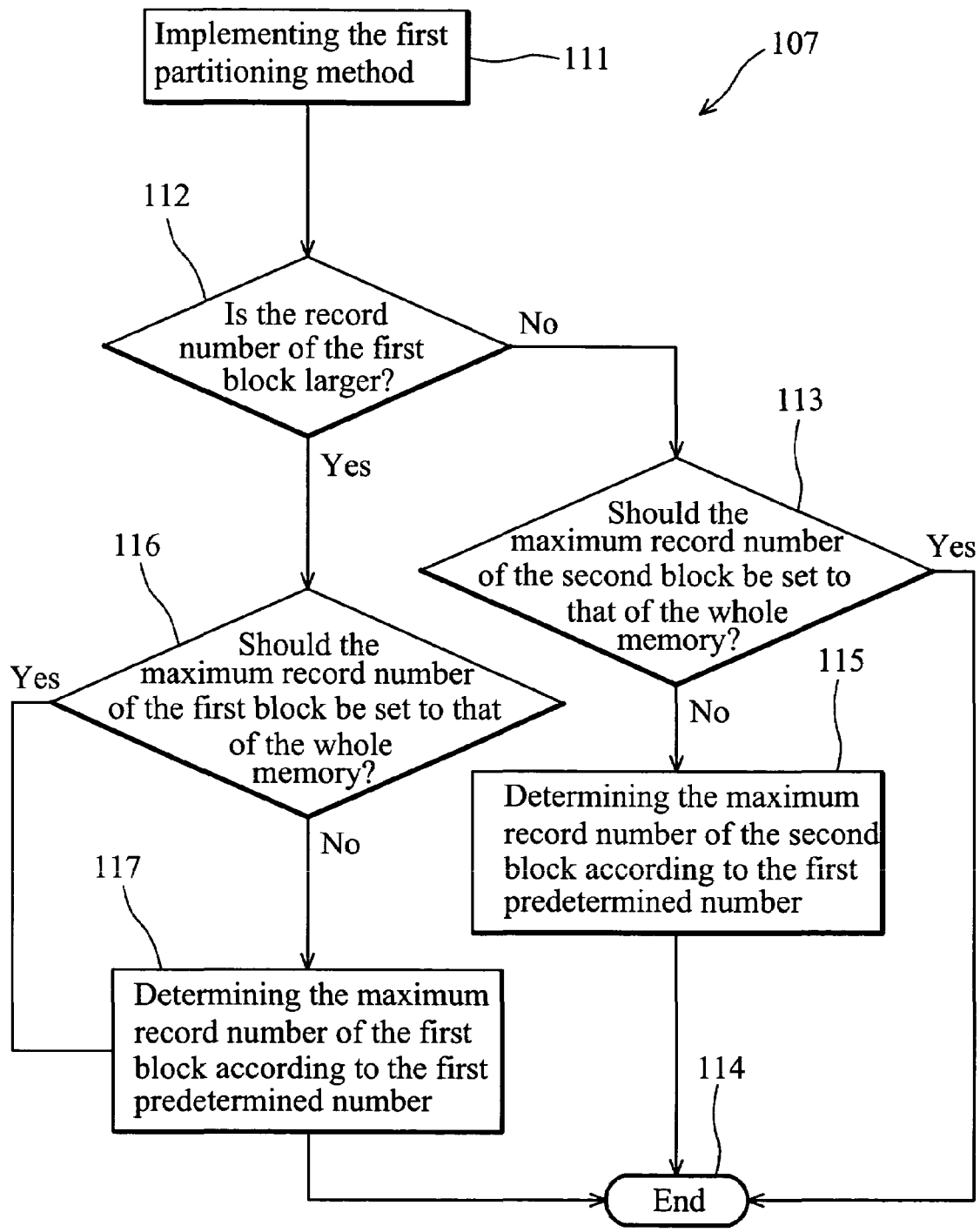
FIG. 2B is a flowchart of the first partitioning method according to one embodiment of the invention.

FIG. 2B is a flowchart of the first partitioning method in step 107.

In step 111, the first partitioning method is implemented when the difference between the number of optimal recording power records in the first and second blocks is larger than a first predetermined value. In step 112, it is determined whether the number of the records in the first block is larger than that in the second block. If so, step 116 is implemented; otherwise, step 113 is implemented.

In step 113, it is determined whether the maximum number of records in the second block is set to be equal to the maximum number of records in the entire memory. If so, the first partitioning method is ended; otherwise, step 115 is implemented.

In step 115, the maximum number of records in the second block is determined according to the first predetermined number.

In step 116, it is determined whether the maximum number of records in the first block is set to be equal to the maximum number of records in the entire memory. If so, the first partitioning method is ended; otherwise, step 117 is implemented.

In step 117, the maximum number of records in the first block is determined according to the first predetermined number.

Figure 2C:
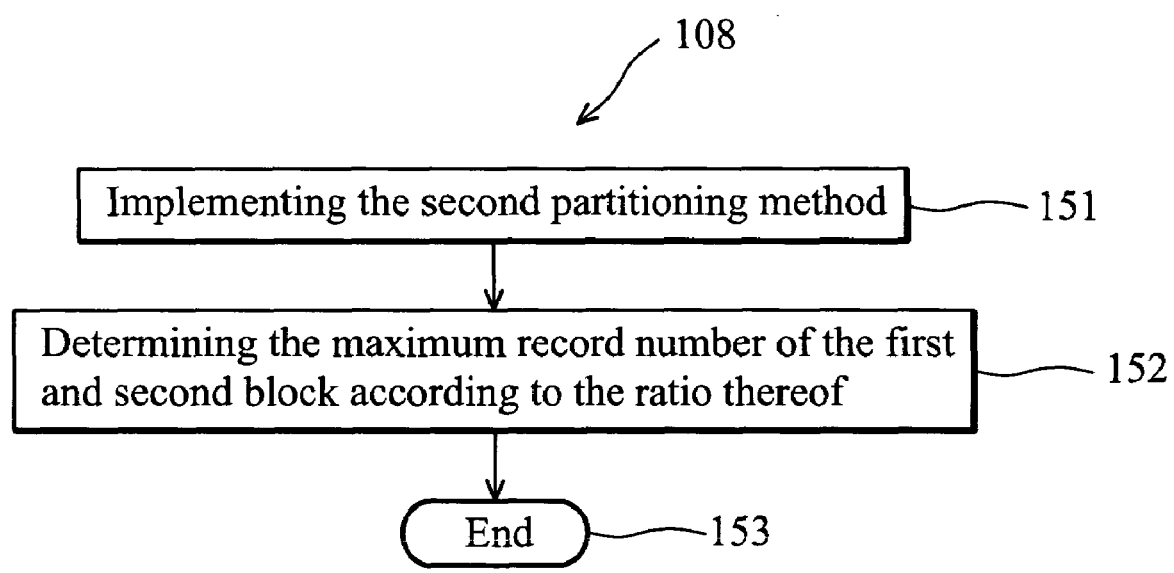
FIG. 2C is a flowchart of the second partitioning method according to one embodiment of the invention.

Since the recording medium stores a recording power record into the corresponding block of the memory before writing data to the CD, the number of the records in the first block may be larger or smaller than that in the second block. Once the difference therebetween being larger than the first predetermined value, the first partitioning method begins (step 107). Consequently, step 112 is followed by step 113 or 116. The maximum number of records in the first and second blocks may be set at a maximum to be equal to the maximum number of records in the entire memory in steps 113 and 116. Alternatively, the maximum numbers of records in the first and second blocks may be determined according to the first predetermined value in steps 115 and 117. That is to say, memory space of the first block is set higher than that of the second block when the number of the records stored in the first block is larger than that in the second block, while memory space of the second block is set higher than that of the first block when the number of the records stored in the second block is larger than that in the first block. Moreover, the first predetermined value is defined by the recording medium and is smaller than the maximum number of records in the entire memory. It may be determined by trial and error. FIG. 2C is a flowchart of the second partitioning method according to one embodiment of the invention.

In step 151, the second partitioning method is implemented when the sum of the numbers of the optimal recording power records in the first and second blocks is larger than a second predetermined value.

In step 152, the space ratio of partitions in the memory is set to be equal to the ratio of the records in the first and second blocks, i.e. the maximum number of records in the first block is set to be equal to the product of the maximum number of records in the entire memory and a ratio of the number of records stored in the first block to the sum of records stored in the first and second blocks while the maximum number of records in the second block is set to be equal to the product of the maximum number of records in the entire memory and a ratio of the number of records stored in the second block to the sum of records stored in the first and second block.

Since the recording medium stores a recording power record into the corresponding block of the memory before writing data to the CD, the second partitioning method is implemented after the sum of records in the first and second blocks becomes larger than the second predetermined value in step 108. The maximum number of records in the first and second blocks is adjusted according to ratios of the number of records currently stored in the first and second blocks to the sum thereof. Consequently, memory space of the first block is set higher than that of the second block if the number of records currently stored in the first block is larger than that in the second block; while memory space of the second block is set higher than that of the first block if the number of records currently stored in the second block is larger than that in the first block. The second predetermined number is smaller than the maximum number of records in the entire memory. In conclusion, the present invention provides a method for dynamically adjusting a space ratio of partitions in the memory. By a graphical user interface, either users determine the space ratio of the partitions for the CD-R and CD-RW, or automatic partition of the space ratio is determined according to the numbers of the optimal recording power records for CD-R and CD-RW. This improves memory efficiency and the lifetime of the memory.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for dynamically partitioning a memory of a recording drive, wherein the memory has a first and second block which at least an optimal recording power record for a first type of recording disk and at least an optimal recording power record for a second type of recording disk are stored respectively, the method comprising:

predetermining a ratio of memory spaces of the first and second block; and selecting a method from a first and a second partitioning method to determine the ratio of memory spaces of the first and second blocks when the ratio is not predetermined;

wherein the first partitioning method comprises step of determining the ratio of memory spaces of the first and second blocks according to a first predetermined value when a difference between the number of the optimal recording power records for the first type of recording disk and the optimal recording power records for the second type of recording disk reaches the first predetermined value while the second partitioning method comprises step of determining the ratio of memory spaces of the first and second blocks according to a ratio of the optimal recording power records for the first type of recording disk to the optimal recording power records for the second type of recording disk when a total of the optimal recording power records reaches a second predetermined value.

2. The method as claimed in claim 1, wherein the first and second predetermined value are smaller than a maximum number of records stored in the memory.

3. The method as claimed in claim 1, wherein the first partitioning method further comprises step of setting the maximum number of the optimal recording power records in the first or in the second block equal to the maximum number of records stored in the memory.

4. The method as claimed in claim 1, wherein the recording medium drive is allowed to switch between the first and second partitioning method.

5. The method as claimed in claim 1, wherein the optimal recording power records for the second type of recording disk are sequentially written into the second block from a high to a low memory address.

6. The method as claimed in claim 5, wherein the low memory address of the second block is higher than the high memory address of the first block.

7. The method as claimed in claim 5, wherein the low memory address of the first block is higher than the high memory address of the second block.

8. The method as claimed in claim 1, wherein the optimal recording power records for the first type of recording disk are sequentially written into the first block from a high to a low memory address.

9. The method as claimed in claim 8, wherein the optimal recording power records for the second type of recording disk are sequentially written into the second block from a low to a high memory address.

10. The method as claimed in claim 9, wherein the low memory address of the second block is higher than the high memory address of the first block.

11. The method as claimed in claim 9, wherein the low memory address of the first block is higher than the high memory address of the second block.

12. The method as claimed in claim 1, wherein the recording medium recording drive stores the first recording power consumption records corresponding to different types into the first block sequentially from the low memory address and stores the second recording power consumption records corresponding to different types into the second block sequentially from the high memory address.

* * * * *